A. C. THANE.
APPARATUS AND PROCESS FOR SEPARATING AND RECOVERING FINE METALLIC PARTICLES FROM PULP.
APPLICATION FILED APR. 23, 1918.
1,377,738. Patented May 10, 1921.
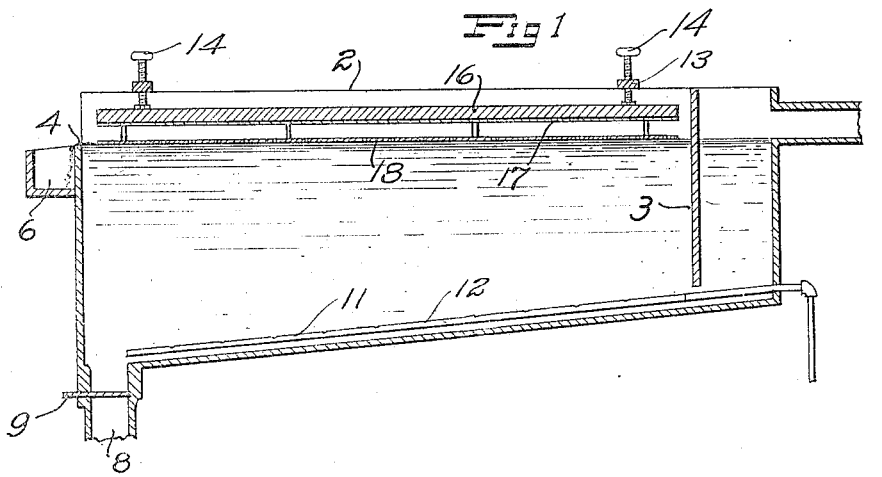
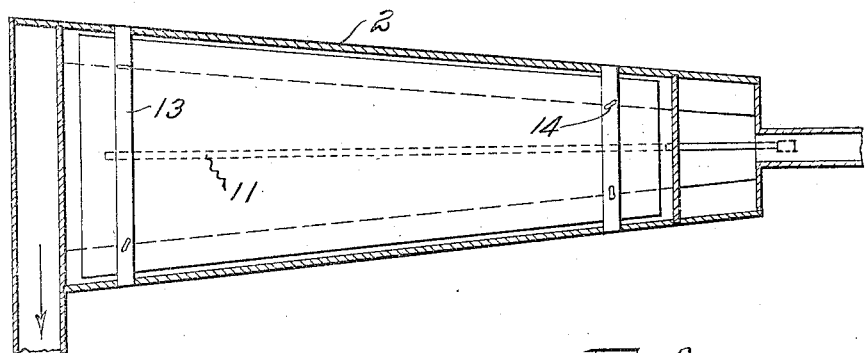
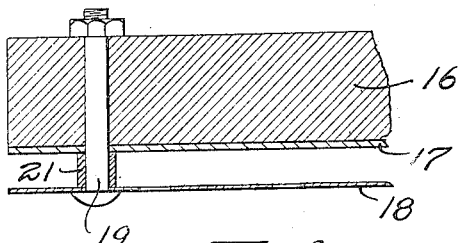
WITNESS
C. S. Evans
INVENTOR.
ARTHUR C. THANE
BY White & Prost
his ATTORNEY

UNITED STATES PATENT OFFICE.

ARTHUR C. THANE, OF CHEWELAH, WASHINGTON.

APPARATUS AND PROCESS FOR SEPARATING AND RECOVERING FINE METALLIC PARTICLES FROM PULP.

1,377,738.  Specification of Letters Patent.  Patented May 10, 1921.

Application filed April 23, 1918. Serial No. 230,363.

*To all whom it may concern:*

Be it known that I, ARTHUR C. THANE, a citizen of the United States, and a resident of Chewelah, county of Stevens, and State of Washington, have invented a new and useful Apparatus and Process for Separating and Recovering Fine Metallic Particles from Pulp, of which the following is a specification.

My invention relates to an apparatus and process for the recovery of metalliferous matter from ores, gravels, sands and the like.

An object of the invention is to provide a process for the recovery of the very fine particles of valuable metal from tailings, dredge sands, slimes and pulps.

Another object of the invention is to provide an apparatus with which my process may be performed.

The invention possesses many other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a longitudinal vertical sectional view of the apparatus with which my process is performed.

Fig. 2 is a plan view of the apparatus.

Fig. 3 is a vertical sectional view on an enlarged scale of a portion of the amalgamated plate and the support for the same.

Broadly stated my process includes the use of an amalgamated plate of particular construction above a body of pulp or other liquid in which fine, free particles of valuable metal are in suspension, and in so treating the liquid by properly directed currents of fluid, that bubbles of the fluid are formed in the liquid, and which, rising to the surface, carry with them the fine particles of value and deposit the values upon the plate which is closely spaced to the surface of the pulp. In other words the bubbles produced by the air float to the top of the fluid level and become attached to the amalgamating device, the surface of which is preferably disposed so as not to be washed or scoured by the pulp passing through the tank.

The process may be used in connection with the recovery of valuable particles of coarser sizes, but its chief value is believed to lie in the recovery of the excessively small particles, such as float gold, which usually escape in the tailings, and in the working of dredger sands, muds and other deposits in which the values are too fine to recover by previously existing methods. For convenience, I shall use the term, "pulp" to designate the value bearing material treated by my process, and this term will be understood to include sands, slimes, gangue, muds or any other mixture of valuable particles, waste matter and liquid.

The apparatus includes a tank 2 for containing the pulp to be treated. Preferably the tank is narrower at one end than at the other and narrower at the bottom than at the top. A diving board or screen 3 is disposed at the narrow end adjacent the inlet so that the incoming material will not produce objectionable currents in the body of the pulp, and a lip 4 is arranged at the opposite end of the tank at such a height as to maintain the pulp in the tank at substantially a constant level. A launder 6 is arranged below the lip 4 to carry off the discharge.

Preferably the bottom 7 of the tank is given a slope toward the discharge end and a discharge passage 8 normally closed by the valve 9 provides means for removing the heavier particles which settle upon the bottom of the tank and are gradually conveyed toward the lower end.

Arranged upon the bottom of the tank are one or more pipes 11 provided with spaced apertures 12 therein, whereby a fluid such as air or water, but preferably air may be introduced into the pulp for the purpose of creating bubbles therein.

Supported at the top of the tank upon suitable cross bars 13, by adjusting screws 14 is a plate 16 which may be of wood or other suitable material. Upon the under surface of the plate 16 is a thin plate 17 amalgamated on the lower side, and spaced a short distance below the plate 17 is a thin foraminated plate or screen 18 which is amalgamated upon both sides. The amalgamated plates are detachably secured to the backing plate 16 by bolts 19 passing through all three plates, a bushing 21 being disposed upon the bolts between the amalgamated plates to properly space them. The adjusting screws 14 are manipulated to level the amalgamated plates and position them preferably just above the surface of the pulp in the tank, and fluid preferably air is introduced into the pulp through the pipe 11. The air bubbles thus formed pass upwardly and break upon the surface, carrying with them the minute particles of values held in suspension in, or floating upon the pulp. It is probable that surface tension in the bubbles within the pulp as well as the agitation of the pulp by reason of the movement of the bubbles therein, and also the surface tension in the bubbles forming any froth which may collect on the surface of the pulp, all contribute a part in the conveyance of the fine values to the amalgamated plates. Some of these particles will be caught upon the lower surface of the foraminated plate; other particles will be carried through the apertures in the foraminated plate and will be caught by the upper surface thereof or by the lower surface of the upper plate 17. The pulp fluid carried in between the plates will of course drain back into the body of pulp below, and the air, having served its function escapes at the edges of the plates.

At desired intervals the amalgamated plates are taken from the apparatus and the amalgam removed by the usual means.

I claim:

1. In an apparatus of the character described, a tank adapted to contain pulp, an amalgamated plate, means for suspending said plate adjacent to the surface of the pulp in said tank, and an amalgamated foraminated plate disposed between and spaced from said first plate and the surface of the pulp.

2. In an apparatus of the character described, a tank adapted to contain pulp, an amalgamated plate, means for suspending said plate above and closely adjacent to the surface of the pulp in said tank and means for introducing jets of fluid into said pulp adjacent the bottom thereof, whereby the fine values in the pulp are carried upwardly into contact with said plate by the bubbles formed in the pulp by said fluid.

3. In an apparatus of the character described, a tank adapted to contain pulp, an amalgamated plate, means for suspending said plate adjacent to the surface of the pulp in said tank, an amalgamated foraminated plate disposed between and spaced from said first plate and the surface of the pulp, and means for producing bubbles of fluid in said pulp, whereby the fine values in the pulp are entrained in said bubbles and carried into contact with said plate.

4. The process of recovering metalliferous particles from pulp which consists in producing bubbles within the pulp and allowing the bubbles as they emerge from the pulp to contact with an amalgamated plate.

5. The process for recovering metalliferous values from liquid pulp, which consists of flowing the pulp into a tank having a liquid discharge so disposed to maintain a substantially normal level and depth of liquid in the tank and having an amalgamating surface slightly above the level so as not to be scoured by the flowing pulp, and discharging air into the pulp in such manner as to produce bubbles to catch and convey the fine metallic particles to the surface of the pulp and into proximity with the amalgamated surface and so that the bubbles break in close relation to the said surface.

6. The process for the recovery of fine metallic particles in liquid pulp, which consists of flowing the pulp through a tank having a normally constant liquid level; aerating the liquid to form air bubbles to entrain the metallic particles and carry them to the surface of the liquid in the tank, and catching the bubbles on an amalgamating surface disposed above the liquid so that the surface is not washed by the pulp.

7. In an apparatus for the recovery of fine metallic values by the flotation process, a tank through which liquid pulp continually passes, means for introducing a gaseous fluid into the tank to produce bubbles to form vehicles for the fine metallic particles, and an amalgamating plate disposed slightly above the normal pulp level so as to prevent scouring action by the flowing pulp and to be engaged by the laden bubbles.

8. In an apparatus for the recovery of fine metallic values by the flotation process, a tank through which liquid pulp continually passes, means for introducing a gaseous fluid into the tank to produce bubbles to form vehicles for the fine metallic particles, and an amalgamating device disposed just above the normal level of the pulp liquid and comprising a lower foraminous member and an upper imperforate plate forming therebetween a collecting space for the bubbles.

In testimony whereof, I have hereunto set my hand at San Francisco, California, this 10th day of April, 1918.

ARTHUR C. THANE.

In presence of—
C. S. EVANS.